(12) United States Patent
Sakata et al.

(10) Patent No.: US 9,321,373 B2
(45) Date of Patent: Apr. 26, 2016

(54) VEHICLE SEATS

(71) Applicant: TOYOTA BOSHOKU KABUSHIKI KAISHA, Aichi-ken (JP)

(72) Inventors: Masaru Sakata, Aichi-ken (JP); Mitsuko Hama, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 26 days.

(21) Appl. No.: 14/082,731

(22) Filed: Nov. 18, 2013

(65) Prior Publication Data
US 2014/0167465 A1 Jun. 19, 2014

(30) Foreign Application Priority Data
Dec. 19, 2012 (JP) .................. 2012-276911

(51) Int. Cl.
*A47C 7/14* (2006.01)
*B60N 2/02* (2006.01)
*B60N 2/62* (2006.01)
*B60N 2/44* (2006.01)

(52) U.S. Cl.
CPC ............ *B60N 2/0284* (2013.01); *B60N 2/4415* (2013.01); *B60N 2/4495* (2013.01); *B60N 2/62* (2013.01)

(58) Field of Classification Search
CPC ............ A47C 4/54; A47C 7/467; B60N 2/66; B60N 2/62
USPC ............... 297/284.11, 452.41, DIG. 3, 284.6, 297/284.2, 284.1
See application file for complete search history.

(56) References Cited

U.S. PATENT DOCUMENTS

| | | | | |
|---|---|---|---|---|
| 3,330,598 A | * | 7/1967 | Whiteside ................ | A47C 4/54 |
| | | | | 297/284.3 |
| 4,615,563 A | * | 10/1986 | Kobayashi ................ | 297/284.6 |
| 4,699,424 A | * | 10/1987 | Andres et al. ............. | 297/284.6 |
| 4,759,543 A | * | 7/1988 | Feldman .................... | 482/148 |
| 4,965,899 A | * | 10/1990 | Sekido et al. ............. | 297/284.6 |
| 5,082,326 A | * | 1/1992 | Sekido et al. ............. | 297/284.6 |
| 5,431,112 A | * | 7/1995 | Thompson ................ | 108/7 |
| 5,572,933 A | * | 11/1996 | Thompson ................ | 108/7 |

(Continued)

FOREIGN PATENT DOCUMENTS

| JP | 61-204553 | 12/1986 |
|---|---|---|
| JP | 2-141233 | 11/1990 |

(Continued)

OTHER PUBLICATIONS

Official Action, with English-language translation thereof, for JP Appl. No. 2012-276911 mailed on Mar. 8, 2016.

*Primary Examiner* — David E Allred
*Assistant Examiner* — Alexander Harrison
(74) *Attorney, Agent, or Firm* — Greenblum & Bernstein, P.L.C.

(57) ABSTRACT

Embodiments of the present invention may include a vehicle seat having a seat cushion. The seat cushion may have a cushion frame, a cushion pad arranged on the cushion frame, and an airbag provided on a front portion of the seat cushion. The airbag preferably has a lower air chamber and an upper air chamber situated above the lower air chamber. The airbag is configured such that, when the upper and lower air chambers are at least partially filled with compressed air, the seat cushion is elongated while an upper portion of a peripheral wall of the lower air chamber supports a lower portion of a peripheral wall of the upper air chamber.

7 Claims, 4 Drawing Sheets

(56) References Cited

U.S. PATENT DOCUMENTS

| | | | | |
|---|---|---|---|---|
| 5,658,050 | A | * | 8/1997 | Lorbiecki ................. 297/452.41 |
| 5,904,219 | A | * | 5/1999 | Anahid et al. ................. 180/273 |
| 6,851,755 | B2 | * | 2/2005 | Dinkel et al. ............ 297/452.48 |
| 7,556,312 | B2 | * | 7/2009 | Yoshikawa et al. ........ 297/216.1 |
| 7,857,387 | B2 | * | 12/2010 | Habegger ................... 297/284.6 |
| 7,878,589 | B2 | * | 2/2011 | Murakami ......... B60N 2/42763 297/216.1 |
| 8,998,320 | B2 | * | 4/2015 | Mankame ............. B60N 2/002 297/284.11 |
| 2003/0094841 | A1 | * | 5/2003 | McMillen ................ B60N 2/48 297/284.1 |
| 2004/0174056 | A1 | * | 9/2004 | Gryp et al. ................. 297/284.6 |
| 2005/0046156 | A1 | * | 3/2005 | Yoshikawa et al. ........ 280/728.2 |
| 2007/0158985 | A1 | * | 7/2007 | Mundell ................ B60N 2/206 297/284.2 |
| 2008/0277985 | A1 | * | 11/2008 | Petzel ........................ 297/284.6 |
| 2010/0244504 | A1 | * | 9/2010 | Colja et al. ................. 297/180.1 |

FOREIGN PATENT DOCUMENTS

| | | |
|---|---|---|
| JP | 2008142120 | 6/2008 |
| JP | 2010-279650 | 12/2010 |

* cited by examiner

VEHICLE SEATS

This application claims priority to Japanese patent application serial number 2012-276911, the contents of which are incorporated herein by reference.

BACKGROUND OF THE INVENTION

1. Field of the Invention

Embodiments of the present invention relate to vehicle seats having a seat cushion with an adjustable length.

2. Description of the Related Art

Japanese Laid-Open Patent Publication No. 2008-142120 discloses a vehicle seat having a seat cushion with an adjustable length. The seat cushion has an airbag and a cushion frame with a front frame portion. The airbag is provided on the front side of the front frame portion. The airbag is inflated by being filled with compressed air in order to elongate the seat cushion. The airbag is deflated through release of the compressed air in order to shorten the seat cushion to the former length.

In this structure, it is not easy to increase the adjustable length of the seat cushion because the airbag will droop, for example, when the airbag is inflated in a forward direction.

Therefore, there is a need in the art for a vehicle seat equipped with a seat cushion having a large adjustable length.

SUMMARY OF THE INVENTION

According to an aspect of the invention, certain embodiments of the present invention include a vehicle seat having a seat cushion. The seat cushion has a cushion frame, a cushion pad arranged on the cushion frame, and an airbag provided on a front portion of the seat cushion. The airbag has a lower air chamber and an upper air chamber situated above the lower air chamber. The airbag is configured such that, when the upper and lower air chambers are at least partially filled with compressed air, the seat cushion is elongated while an upper portion of a peripheral wall of the lower air chamber supports a lower portion of a peripheral wall of the upper air chamber.

When the seat cushion is elongated, the upper and lower air chambers are filled with compressed air. The peripheral wall of the upper air chamber expands forward to elongate the seat cushion. At this time, the upper portion of the peripheral wall of the lower air chamber supports the lower portion of the peripheral wall of the upper air chamber. Thus, the peripheral wall of the upper air chamber expands forward in a stable manner. In this way, the adjustment length of the seat cushion may increase.

In another aspect of the invention, the upper air chamber may have a front upper air chamber and a rear upper air chamber situated behind the front upper air chamber. A recess or cleavage may be formed between lower portions of respective peripheral walls of the front and rear upper air chambers. The lower air chamber may have the upper portion of the peripheral wall supporting the lower portions of the respective peripheral walls of the front and rear upper air chambers from the recess below.

Thus, by virtue of the recess, the upper portion of the peripheral wall of the lower air chamber can support the respective lower portions of the peripheral walls of the front and the rear upper air chambers in a stable manner. As a result, the front and the rear upper air chambers can inflate in a stable manner, making it possible to efficiently increase the adjustable length of the seat cushion.

In another aspect of the invention, the airbag may have a first airbag having a first air chamber and a second airbag having a second air chamber. Thus, as compared with the construction in which every air chamber is formed by a single airbag, the air chambers can be formed more easily.

In another aspect of the invention, there may be provided a structure for individually controlling the injection amount and/or the discharge amount of compressed air with respect to each air chamber.

In another aspect of the invention, the cushion frame may have the front portion and/or a support member integrally or individually located within. The support member may support a lower portion of the peripheral wall of the lower air chamber. Thus, due to the support member, the airbag is supported in a stable manner. Further, the airbag can be inflated and deflated smoothly.

DETAILED DESCRIPTION OF THE INVENTION

Each of the additional features and teachings disclosed above and below may be utilized separately or in conjunction with other features and teachings to provide improved vehicle seats. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
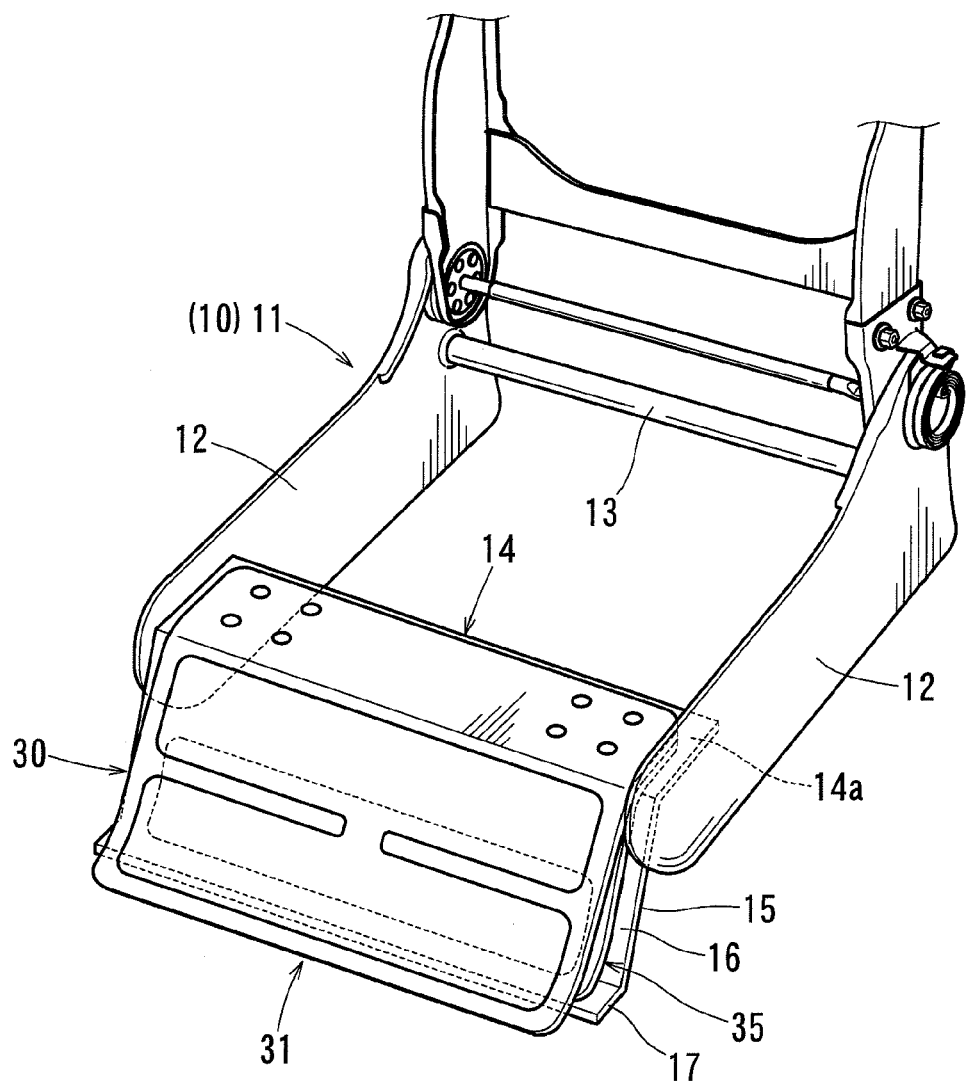
FIG. 1 is a perspective view of a part of a vehicle seat's frame and first and second airbags mounted on a front frame portion of the frame.
Figure 2:
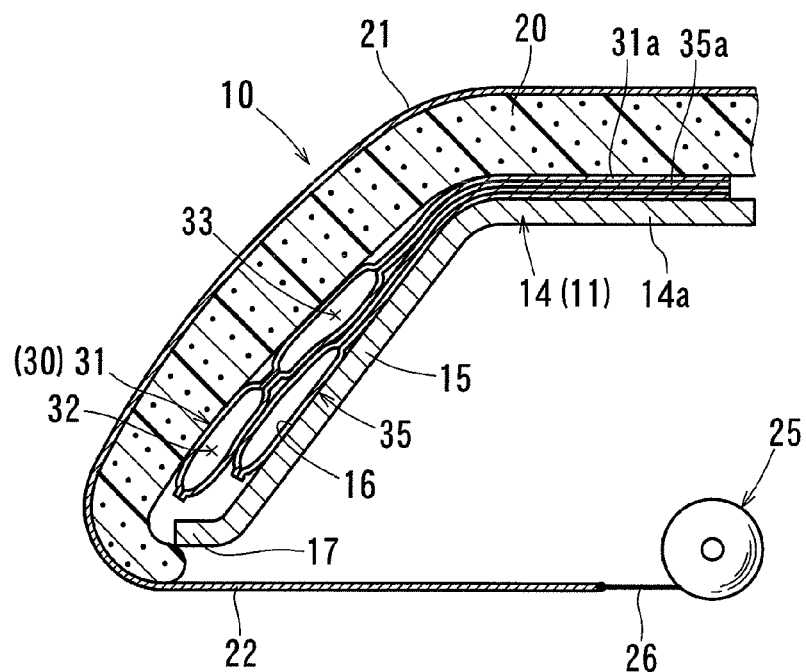
FIG. 2 is a cross-sectional side view of a part of a seat cushion having the first and second airbags therein.

An embodiment of the present invention will be described with reference to FIGS. 1 to 4. As shown in FIGS. 1 and 2, a seat cushion 10 of a vehicle seat has a cushion frame 11, a cushion pad 20, and a skin member 21. The cushion pad 20 is formed of an elastic material such as urethane foam, and is arranged on the cushion frame 11. The skin member 21 covers the surface of the cushion pad 20. A front end 22 of the skin member 21 is connected to a take-up device 25. The take-up device 25 takes up and forces out the skin member 21 while maintaining it under a pre-set tension.

As shown in FIG. 1, the cushion frame 11 is of a rectangular configuration, and has side frame portions 12, a rear frame portion 13, and a front frame portion 14. Both the right and left side frame portions 12 are provided at a predetermined interval in a vehicle width direction. The rear frame portion 13 extends between rear portions of the side frame portions 12. The front frame portion 14 has a main body portion 14a horizontally extending between front portions of the side frame portions 12, and a support member 15 extending downwardly forward from a front edge of the main body portion 14a.

The support member 15 has an inclined surface 16 directed upwards. A lower end bent portion 17 is formed at a distal end of the support member 15.

As shown in FIGS. 1 and 2, an airbag (airbag assembly) 30 is arranged on the front frame portion 14. The airbag 30 is inflated by being filled with compressed air, and is deflated through release of the compressed air. The airbag 30 has a first airbag 31 situated on an upper side, and a second airbag 35 situated on the lower side of the first airbag 31. Distal portions 31a and 35a of the first and second airbags 31 and 35 are respectively fixed to an upper surface of the main body portion 14a of the front frame portion 14. The first and second airbags 31 and 35 extend along the inclined surface 16 of the support member 15.

As shown in FIG. 2, the first airbag 31 has air chambers 32 and 33 as upper air chambers. The air chamber 32 extends in the vehicle width direction at a position corresponding to a front region of the support member 15. The air chamber 33 extends in the vehicle width direction at a position corresponding to a rear region of the support member 15. The air chambers 32 and 33 may partially communicate with each other.

The second airbag 35 has an air chamber 36 as a lower air chamber. The air chamber 36 extends in the vehicle width direction. The air chambers 32, 33, and 36 are connected to a compressor (not shown) via a selector valve. The compressor generates compressed air. The selector valve allows an individual supply of compressed air to the air chambers 32, 33, and 36.

Figure 4:
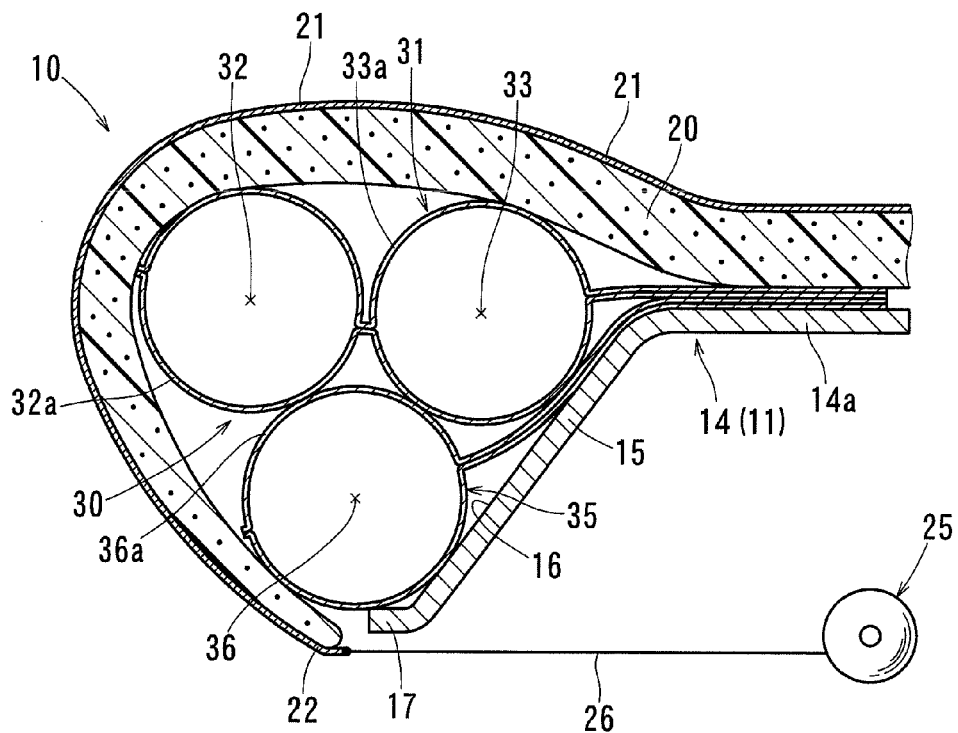
FIG. 4 is a cross-sectional side view of the part of the seat cushion in a situation that the first and second airbags are fully inflated.

As shown in FIG. 4, through filling of the air chambers 32, 33, and 36 with compressed air, the first airbag 31 and the second airbag 35 are inflated. The air chamber 36 is situated at a recess (or cleavage) between the air chambers 32 and 33. A peripheral wall 36a of the air chamber 36 supports respective peripheral walls 32a and 33a of the air chambers 32 and 33 from below. Lower side and (rear) side portions of the peripheral wall 36a of the air chamber 36 are supported by a lower portion of the inclined surface 16 of the support member 15 and by the lower end bent portion 17. A (rear) side portion of the peripheral wall 33a of the air chamber 33 is supported by an upper portion of the inclined surface 16.

Figure 3:
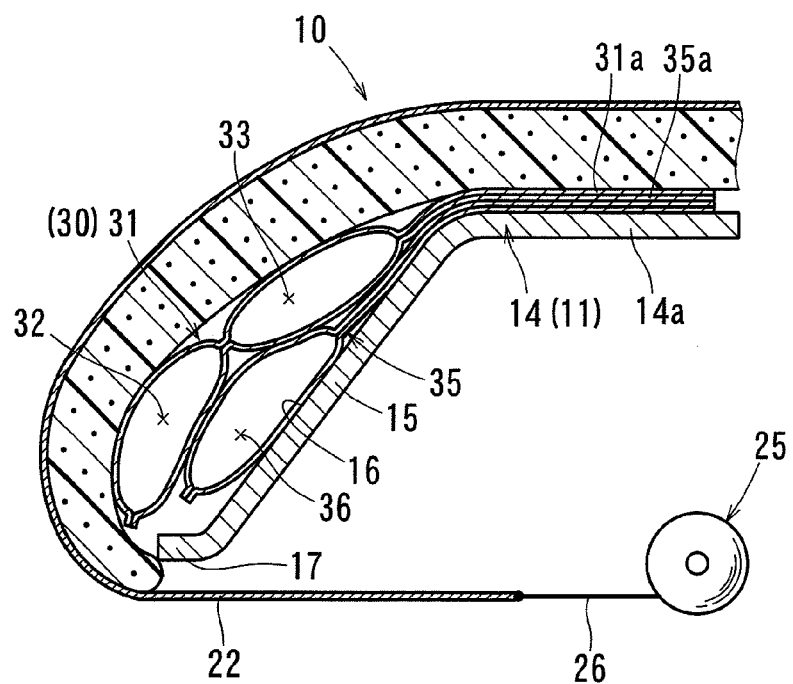
FIG. 3 is a cross-sectional side view of the part of the seat cushion in a situation that the first and second airbags are partially inflated.

As shown in FIGS. 3 and 4, when the seat cushion 10 is elongated, the air chambers 32, 33, and 36 are inflated. A wire 26 of the take-up device 25 is forwardly forced out, with the tension applied to the skin member 21 being maintained at a predetermined magnitude. As a result, the seat cushion 10 is elongated forwardly in a stable manner.

The seat cushion 10 has a seat length corresponding, for example, to a region extending substantially horizontally. The front end of the seat length in FIG. 2 corresponds to the front end of the main body portion 14a of the front frame portion 14. The front end of the seat length in FIG. 3 is situated above the support member 15. The front end of the seat length in FIG. 4 is situated forward at a front end of the support member 15.

As shown in FIGS. 3 and 4, when the seat cushion 10 is long, the upper portion of the peripheral wall 36a of the air chamber 36 supports the lower portions of the peripheral walls 32a and 33a of the air chambers 32 and 33. Thus, the seat cushion 10 is elongated in a stable manner, and the adjustable length of the seat cushion 10 may increase.

As shown in FIG. 4, at the time of inflation of the airbags 31 and 35 (in particular, at the time of full inflation), a recess is formed between the lower portions of the peripheral walls 32a and 33a of the air chambers 32 and 33. The air chamber 36 is situated at the recess between the lower portions of the air chambers 32 and 33. The upper portion of the peripheral wall 36a of the air chamber 36 supports the lower portions of the air chambers 32 and 33. As a result, the second airbag 35 can support the first airbag 31 in a stable manner. As a result of the inflation of the front and rear air chambers 32 and 33 of the airbag 31, the seat cushion 10 is elongated. Thus, it is possible to efficiently adjust the length of the seat cushion 10.

As shown in FIGS. 2 to 4, the airbag 30 has the first airbag 31 situated on the upper side and the second airbag 35 situated on the lower side. The first airbag 31 has the air chambers 32 and 33 longitudinally arranged with respect to each other. The second airbag 35 has the air chamber 36. Thus, the air chambers 32 and 33 situated on the upper side and the air chamber 36 situated on the lower side can be easily formed through separate formation.

The injection and discharge amounts of compressed air of the air chambers 32, 33, and 36 can be individually controlled. Thus, it is possible to elongate the seat cushion 10 in a stable manner.

As shown in FIG. 4, the lower portion of the peripheral wall 36a of the air chamber 36 and the (rear) side wall portion thereof are supported by the lower portion of the inclined surface 16 of the support member 15 and by the lower end bent portion 17. Thus, the airbags 31 and 35 are supported in a stable manner, and can be inflated and deflated smoothly.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

As shown in FIG. 4, the air chambers 32 and 33 may be provided in the first airbag 31, and the air chamber 36 may be provided in the second airbag 35. Alternatively, a plurality, for example more than two, of air chambers may be provided in a single airbag.

Figure 5:
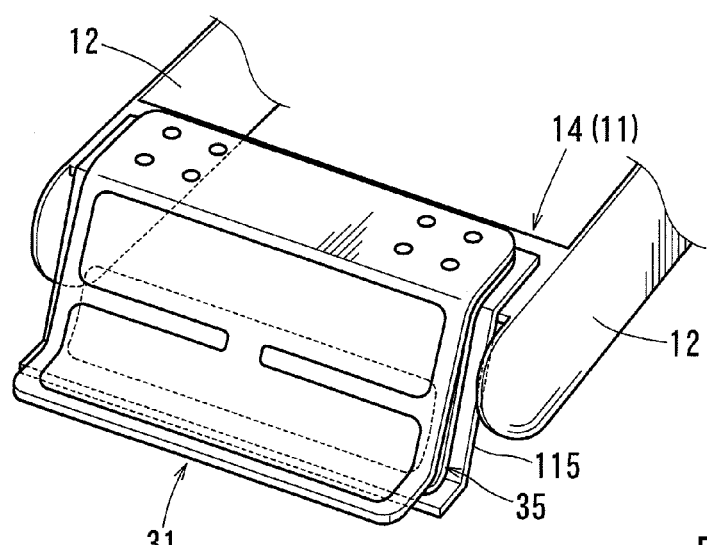
FIG. 5 is a perspective view of a part of a vehicle seat frame having a front frame portion and a support member individually incorporated.

As shown in FIG. 4, the cushion frame 11 may have a front frame portion 14 and a support member 15 that are continuously integrated. Alternatively, as shown in FIG. 5, the cushion frame 11 may have a support member 115 and the front frame portion 14 individually constructed. The first and second airbags 31 and 35 may be mounted to the support member 115. The support member 115 may be mounted to the front frame portion 14. The support member 115 may be detachably attached to the front frame portion 14 by a mounting means such as a screw or a clip. As a result, the airbags 31 and 35 can be easily mounted to the cushion frame 11.

Figure 6:
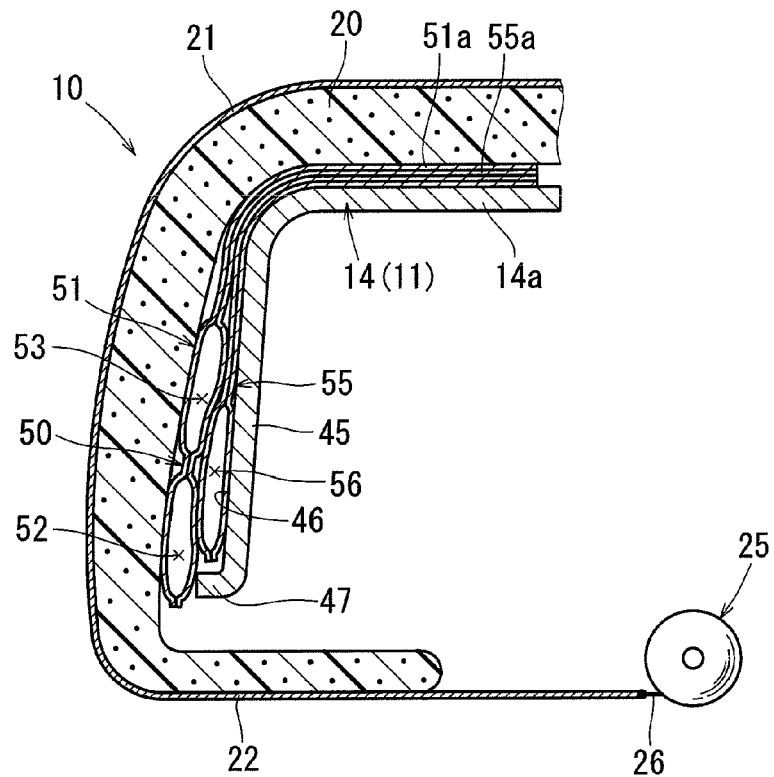
FIG. 6 s a cross-sectional side view of a part of a seat cushion with an ottoman having a first and second airbags therein.
Figure 7:
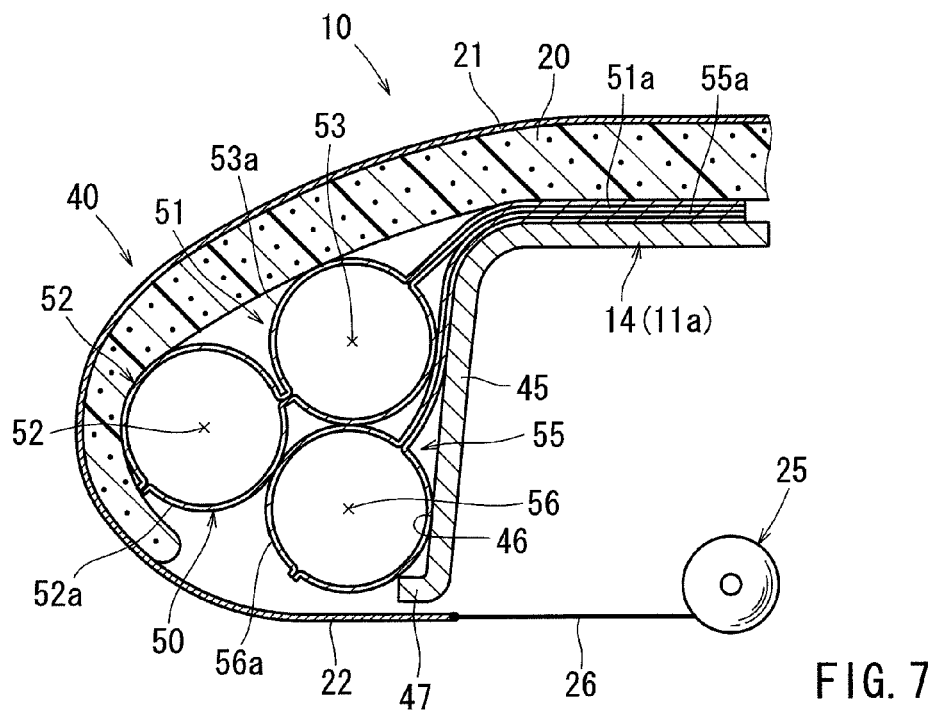
FIG. 7 is a cross-sectional side view of the part of the seat cushion of FIG. 6 in a situation where the first and second airbags are fully inflated.

As shown in FIGS. 2 to 4, the seat cushion 10 may have the support member 15 and the air bag 30. Alternatively, as shown in FIGS. 6 and 7, the seat cushion 10 may have a support member 45 and an airbag 50. The support member 45 and airbag 50 elongate the front portion of the seat cushion 10 in a forward direction. Thus the front of the cushion 10 may be changed into an ottoman 40 for supporting the calves of a user sitting on the seat cushion 10.

As shown in FIGS. 6 and 7, the support member 45 extends downward from the front edge of the main body portion 14a of the frame portion 14. The support member 45 has a surface 45a directed in a forward direction. A lower end bent portion 47 is formed at a distal end of the support member 45.

As shown in FIGS. 6 and 7, an airbag (airbag assembly) 50 is situated on a front side of the support member 45. The airbag 50 has a first airbag 51 situated on a front side, and a second airbag 55 situated on a back side of the first airbag 51. Distal portions 51a and 55a of the first and second airbags 51 and 55 are fixed to the upper surface of the main body portion 14a. The first airbag 51 has a front air chamber 52 and an upper air chamber 53. The air chambers 52 and 53 may partially communicate with each other. The second airbag 55 preferably has a lower air chamber 56.

As shown in FIGS. 6 and 7, through filling of the air chambers 52, 53, and 56 with compressed air, the first and second airbags 51 and 55 are inflated. The air chamber 56 is situated at a recess between the air chambers 52 and 53. A peripheral wall 56a of the air chamber 56 supports a peripheral wall 53a of the air chamber 53 from below. The peripheral wall 56a supports a peripheral wall 52a of the air chamber 52 from behind. Back and lower portions of the peripheral wall 56a are supported by the surface 46 and the lower end bent portion 47.

As shown in FIGS. 6 and 7, when the air chambers 52, 53, and 56 are inflated, the front portion of the seat cushion 10 is elongated. The front portion extends forward such that an upper surface thereof extends forward and downward. Thus the front portion is used as the ottoman 40 for supporting the calves of the user. The take-up device 25 rolls out the wire 26. The skin member 21 moves forward and an end of the skin member 21 covers a space between an end of the cushion pad 20 and the lower end bent portion 47.

As shown in FIGS. 6 and 7, the ottoman 40 may include the air chambers 52, 53 and 56. Alternatively, the ottoman 40 may include two of the air chambers 52, 53 and 56; for example, the air chambers 53 and 56. Alternatively, the ottoman 40 may include more than three air chambers.

This invention claims:

1. A vehicle seat comprising:
    a wire;
    a take-up device connected to the wire; and
    a seat cushion including:
        a cushion frame having a front portion and an upper surface;
        a cushion pad arranged on the upper surface of the cushion frame; and
        an airbag provided on the front portion of the cushion frame, the airbag including:
            a lower air chamber having a peripheral wall with upper and lower portions; and
            an upper air chamber having a peripheral wall with upper and lower portions, the upper air chamber being situated above the lower air chamber, wherein
    the lower and upper air chambers are respectively attached to the upper surface of the cushion frame,
    the cushion frame supports the lower portion of the peripheral wall of the lower air chamber and the upper portion of the peripheral wall of the lower air chamber supports the lower portion of the peripheral wall of the upper air chamber such that when the upper and lower chambers are at least partially filled with compressed air, the seat cushion is elongated in a stable manner, and
    the wire is connected to a front end of a skin member of the seat cushion and configured such that when the air bag is at least partially filled with compressed air, the wire is forwardly forced out of the take-up device and applies tension to the skin member at a predetermined magnitude to forwardly elongate the seat cushion in the stable manner.

2. The vehicle seat of claim 1, wherein the upper air chamber further comprises:
    a front upper air chamber including a peripheral wall; and
    a rear upper air chamber including a peripheral wall, the rear upper air chamber being situated behind the front upper air chamber wherein
        a recess is provided between lower portions of the respective peripheral walls of the front and rear upper air chambers, and
        the upper portion of the peripheral wall of the lower air chamber supports the lower portions of the respective peripheral walls of the front and rear upper air chambers from the recess below.

3. The vehicle seat of claim 1, wherein the airbag further comprises:
    a first airbag having a first air chamber; and
    a second airbag having a second air chamber.

4. The vehicle seat of claim 1, wherein the cushion frame further comprises a support member, wherein
    the support member is configured to support the lower portion of the peripheral wall of the lower air chamber.

5. The vehicle seat of claim 1, wherein the airbag is configured such that the compressed air is individually supplied to the lower and upper air chambers.

6. The vehicle seat of claim 1, the airbag further comprising:
    a front air chamber including a peripheral wall, the front air chamber being situated in front of the upper and lower air chambers, wherein
        a recess is provided between the respective peripheral walls of the front and upper air chambers, and
        the peripheral wall of the lower air chamber supports the respective peripheral walls of the front and upper air chambers from the recess below.

7. The vehicle seat of claim 1, wherein the cushion frame further comprises a support member, the upper and lower air chambers are attached to the support member, and the support member is detachably mounted to the front portion of the cushion frame.

* * * * *